(12) United States Patent
Wang et al.

(10) Patent No.: US 12,151,249 B2
(45) Date of Patent: Nov. 26, 2024

(54) SYSTEM AND METHOD FOR INTEGRATED REMOVAL OF MULTIPLE POLLUTANTS IN FLUE GAS WITH NEAR-ZERO EMISSION

(71) Applicant: HUANENG CLEAN ENERGY RESEARCH INSTITUTE, Beijing (CN)

(72) Inventors: Shiqing Wang, Beijing (CN); Shiwang Gao, Beijing (CN); Lianbo Liu, Beijing (CN); Jinyi Wang, Beijing (CN); Hongwei Niu, Beijing (CN); Dongfang Guo, Beijing (CN)

(73) Assignee: HUANENG CLEAN ENERGY RESEARCH INSTITUTE, Beijing (CN)

( * ) Notice: Subject to any disclaimer, the term of this patent is extended or adjusted under 35 U.S.C. 154(b) by 465 days.

(21) Appl. No.: 17/501,561

(22) Filed: Oct. 14, 2021

(65) Prior Publication Data

US 2022/0048044 A1 Feb. 17, 2022

Related U.S. Application Data

(63) Continuation of application No. PCT/CN2020/121308, filed on Oct. 15, 2020.

(30) Foreign Application Priority Data

Aug. 14, 2020 (CN) .......................... 202010819460.2

(51) Int. Cl.
*B01D 47/06* (2006.01)
*B01D 53/04* (2006.01)
(Continued)

(52) U.S. Cl.
CPC ............. *B03C 3/017* (2013.01); *B01D 47/06* (2013.01); *B01D 53/0438* (2013.01);
(Continued)

(58) Field of Classification Search
None
See application file for complete search history.

(56) References Cited

U.S. PATENT DOCUMENTS 5,075,085 A * 12/1991 Izumi ..................... B01D 53/02
423/243.12
10,174,943 B2 * 1/2019 Boulet ............... B01D 53/0462
(Continued)

FOREIGN PATENT DOCUMENTS

CN 201803886 U * 4/2011
CN 103264996 8/2013
(Continued)

OTHER PUBLICATIONS

CN208678681U_Eng (Espacenet machine translation of Zheng) (Year: 2019).*
(Continued)

*Primary Examiner* — Jonathan Miller
(74) *Attorney, Agent, or Firm* — Hodgson Russ LLP

(57) ABSTRACT

A system for integrated removal of multiple pollutants includes an economizer, an air preheater, an electrostatic precipitator, a flue gas cooler and a low-temperature adsorber; the economizer has a shell side inlet for feeding boiler flue gas, a tube side inlet for feeding boiler feedwater, and a shell side outlet connected to a tube side inlet of the air preheater; the air preheater has a shell side inlet for introducing boiler intake air, and a tube side outlet connected to the electrostatic precipitator; the electrostatic precipitator has a dust discharge port at a bottom thereof and a flue gas outlet connected to the flue gas cooler; the flue gas cooler has a condensate outlet at a bottom thereof and a cold flue gas outlet at a top thereof and connected to the low-temperature adsorber; and the low-temperature adsorber has a purified flue gas outlet at a tail thereof.

20 Claims, 1 Drawing Sheet

(51) Int. Cl.
- *B01D 53/08* (2006.01)
- *B01D 53/26* (2006.01)
- *B03C 3/017* (2006.01)
- *F23J 15/00* (2006.01)
- *F23J 15/02* (2006.01)
- *F23J 15/06* (2006.01)
- *F23L 15/00* (2006.01)

(52) U.S. Cl.
CPC ........... *B01D 53/08* (2013.01); *B01D 53/265* (2013.01); *F23J 15/006* (2013.01); *B01D 2257/2045* (2013.01); *B01D 2257/2047* (2013.01); *B01D 2257/302* (2013.01); *B01D 2257/404* (2013.01); *B01D 2257/602* (2013.01); *B01D 2257/708* (2013.01); *B01D 2258/0283* (2013.01); *B01D 2259/40088* (2013.01); *B01D 2259/402* (2013.01); *F23J 15/02* (2013.01); *F23J 15/06* (2013.01); *F23L 15/00* (2013.01)

(56) References Cited

U.S. PATENT DOCUMENTS

| | | | | |
|---|---|---|---|---|
| 11,925,898 | B2* | 3/2024 | Wang | B01D 53/0438 |
| 2013/0089482 | A1* | 4/2013 | Latimer | B01D 53/77 |
| | | | | 423/243.08 |
| 2015/0369501 | A1* | 12/2015 | Dobbyn | B01D 53/0473/31.03 |
| 2019/0107009 | A1* | 4/2019 | Boulet | B01D 53/02 |

FOREIGN PATENT DOCUMENTS

| | | | | |
|---|---|---|---|---|
| CN | 204648188 | | 9/2015 | |
| CN | 107029534 | A * | 8/2017 | |
| CN | 207137666 | U * | 3/2018 | |
| CN | 208519756 | | 2/2019 | |
| CN | 109499313 | | 3/2019 | |
| CN | 109513341 | | 3/2019 | |
| CN | 208678681 | U * | 4/2019 | |
| CN | 110152478 | A | 8/2019 | |
| CN | 110339657 | A * | 10/2019 | |
| CN | 110743312 | | 2/2020 | |
| CN | 110743313 | | 2/2020 | |
| CN | 110787606 | A * | 2/2020 | B01D 46/023 |
| CN | 111302424 | A | 6/2020 | |
| CN | 210934359 | | 7/2020 | |
| CN | 111495111 | | 8/2020 | |
| CN | 111495112 | | 8/2020 | |
| CN | 111495113 | | 8/2020 | |
| CN | 111495118 | | 8/2020 | |
| CN | 212395927 | | 1/2021 | |
| JP | S524477 | | 1/1977 | |

OTHER PUBLICATIONS

Doty, Steven Turner (2013). Energy Management Handbook (8th Edition)—8.8.7 Heat Pumps. (pp. 216-218). Fairmont Press. https://app.knovel.com/hotlink/pdf/id:kt00C19AF1/energy-management-handbook/heat-pumps (Year: 2013).*

Niessen, Walter R . . . (2010). Combustion and Incineration Processes—Applications in Environmental Engineering (4th Edition)—(pp. 409). Taylor & Francis. https://app.knovel.com/hotlink/pdf/id:kt00CR2IZ6/combustion-incineration/fluidized--operating-characteristics (Year: 2010).*

Couper, James R. (2012). Chemical Process Equipment—Selection and Design (3rd Edition)—20.1.4 Electrostatic Precipitators. (pp. 716-717). Elsevier. https://app.knovel.com/hotlink/pdf/id:kt00BFQZ01/chemical-process-equipment/electrostatic-precipita (Year: 2012).*

Doty et al. (2013. Energy Management Handbook (8th Edition)—8.8.7 Heat Pumps. (pp. 216-218). Fairmont Press.) (Year: 2013).*

Niessen (2010. Combustion and Incineration Processes—Applications in Environmental Engineering (4th Edition)—9.2.3 Operating Characteristics. (pp. 409). Taylor & Francis.) (Year: 2010).*

Couper et al. (2012. Chemical Process Equipment—Selection and Design (3rd Edition)—20.1.4 Electrostatic Precipitators. (pp. 716-717). Elsevier.) (Year: 2012).*

CN110787606A_Eng (Espacenet machine translation of Pan) (Year: 2020).*

CN207137666U_Eng (Espacenet machine translation of Kong) (Year: 2018).*

CN201803886U—preview (IP.com machine translation of Huang) (Year: 2011).*

CN107029534A_Eng (Espacenet machine translation of Zuo) (Year: 2017).*

CN110339657A_Eng (WIPO Patentscope machine translation of Huang) (Year: 2019).*

CNIPA, First Office Action for CN Application No. 202010819460.2, May 26, 2023.

IP Australia, Office Action for AU Application No. 2020440901, Oct. 5, 2022.

* cited by examiner

SYSTEM AND METHOD FOR INTEGRATED REMOVAL OF MULTIPLE POLLUTANTS IN FLUE GAS WITH NEAR-ZERO EMISSION

CROSS-REFERENCE TO RELATED APPLICATION

This application is a continuation application of International Application No. PCT/CN2020/121308, filed Oct. 15, 2020, which is based upon and claims priority to Chinese Patent Application No. 202010819460.2, filed Aug. 14, 2020, the entire contents of which are incorporated herein by reference.

FIELD

The present disclosure relates to the field of treatment and purification of pollutants in a flue gas, and more particularly to a system and method for integrated removal of multiple pollutants in a flue gas with a near-zero emission.

BACKGROUND

A large amount of pollutants generated by coal burning is one of important factors that endanger atmospheric environment and human health, and the pollutants in the coal-fired flue gas may be divided into main pollutants and other pollutants according to their emission amounts and harmful degrees.

The main pollutants include dust, $SO_2$ and $NO_x$, which may be controlled by mature control technologies. At present, the technologies widely used in large coal-burning boilers include bag dust removal, electrostatic dust removal, limestone-gypsum wet desulphurization, and selective catalytic reduction (SCR) denitration. In addition, limestone-injection desulfurization in furnace and selective non-catalytic reduction (SNCR) denitration technologies are also widely used in small and medium fluidized bed boilers.

Other pollutants include $SO_3$, HCl, HF, Hg and volatile organic compounds (VOCs). Among them, HCl and HF are generally removed along with $SO_2$ in wet desulphurization. However, pollutants such as $SO_3$, Hg and VOCs cannot be effectively removed in current flue gas treatment systems. With increasing requirements of environmental protection, it is necessary to control these harmful pollutants.

In the current pollutant removal technology, pollutants are removed one by one in a series system, which makes the process complicated and operating costs high. Therefore, efforts have been made worldwide for many years to develop integrated removal of multiple pollutants in the flue gas, such as an ozone oxidation method, a hydrogen peroxide oxidation method, an electron beam ammonia method, an electro-catalytic oxidation method, a liquid phase catalytic oxidation method, and an activated coke method. In most of these technologies, NO which is difficult to remove by wet absorption is pre-oxidized into $NO_2$, and then is wet removed along with $SO_2$. Therefore, these technologies are limited to integrated desulphurization and denitration and simultaneous removal of HCl and HF, which, however, cannot effectively treat the pollutants like $SO_3$, Hg and VOCs. The activated coke method may simultaneously remove $SO_3$, $SO_3$, $NO_2$, HCl, HF, Hg, VOCs and other pollutants through adsorption, but cannot remove NO through adsorption. However, NO is a most important component of $NO_x$, accounting for more than 95% of NON. By spraying ammonia gas into an activated coke bed, a denitration rate of 70% to 80% may be achieved by catalytic reduction, but it is difficult to meet a near-zero emission.

In addition to the integrated removal of multiple pollutants in the flue gas, the development of near-zero emission technology has also become a hot topic in the flue gas treatment. At present, most large-scale units in China has been transformed to achieve an ultra-low emission standard, i.e., $SO_2 \leq 35$ mg/Nm$^3$, $NO_x \leq 50$ mg/Nm$^3$, and dust $\leq 5$ mg/Nm$^3$. Although the emission concentrations have been controlled to quite low levels, the absolute value of the total pollutant emission is still huge. The near-zero emission of the flue gas pollutants is still one of ultimate goals of clean coal power generation.

SUMMARY

An object of the present disclosure is to provide a system and method for integrated removal of multiple pollutants in a flue gas with a near-zero emission to overcome the drawbacks in the related art. The present disclosure utilizes dissolution and adsorption characteristics of pollutant components in the flue gas at low temperature to remove $SO_2$, $SO_3$, NO, $NO_2$, HCl, HF, Hg and VOCs in the flue gas simultaneously and achieve the near-zero emission.

In order to achieve the above-mentioned object, the present disclosure adopts the following technical solutions.

In a first aspect of the present disclosure, a system for integrated removal of multiple pollutants in a flue gas with a near-zero emission is provided. The system includes an economizer, an air preheater, an electrostatic precipitator, a flue gas cooler and a low-temperature adsorber.

The economizer has a shell side inlet for feeding boiler flue gas, a tube side inlet for feeding boiler feedwater, and a shell side outlet connected to a tube side inlet of the air preheater. The air preheater has a shell side inlet for introducing boiler intake air, and a tube side outlet connected to the electrostatic precipitator. A dust discharge port is provided at a bottom of the electrostatic precipitator, and a flue gas outlet of the electrostatic precipitator is connected to the flue gas cooler. A condensate outlet is provided at a bottom of the flue gas cooler, and a cold flue gas outlet is provided at a top of the flue gas cooler and connected to the low-temperature adsorber. A purified flue gas outlet is provided at a tail of the low-temperature adsorber.

Further, the flue gas cooler is connected with a direct spraying and cooling device or an indirect heat exchange cooling device.

Further, the low-temperature adsorber is a fixed bed adsorber or a moving bed adsorber.

Further, the system includes two low-temperature adsorbers.

In a second aspect of the present disclosure, a method for integrated removal of multiple pollutants in a flue gas with a near-zero emission is provided. The method includes: feeding boiler flue gas into an economizer in which boiler feedwater is heated by the boiler flue gas; transferring the boiler flue gas to an air preheater in which boiler intake air is heated by the boiler flue gas; transferring the flue gas after heat recovery in the economizer and the air preheater to an electrostatic precipitator to remove dust in the flue gas; transferring the dedusted flue gas to a flue gas cooler to be cooled to room temperature or lower; discharging condensate water with some or all of pollutants dissolved therein out of the flue gas cooler; and transferring the cooled flue gas to a low-temperature adsorber to adsorb the pollutants and discharging a purified flue gas.

Further, the flue gas cooler is operated in a direct spraying and cooling manner or an indirect heat exchange cooling manner. In the direct spraying and cooling manner, a small amount of dust not removed by the electrostatic precipitator is washed down and discharged along with the condensate water.

Further, the low-temperature adsorber includes a first low-temperature adsorber and a second low-temperature adsorber. When the first low-temperature adsorber reaches saturation such that $SO_2$ or NO begins to permeate, the cooled flue gas is switched to the second low-temperature adsorber, and the first low-temperature adsorber is regenerated by heating or vacuum sucking.

Compared with the related art, beneficial effects of the present disclosure are as follows.

The present disclosure is suitable for a coal-burning flue gas, such as a power plant flue gas, a steel plant sintering flue gas, a coke oven flue gas and the like. In the flue gas cooler, the temperature of the flue gas is decreased to the room temperature or lower, such that HCl, HF and a part of $SO_3$, $NO_2$ and Hg in the flue gas are dissolved in the condensate water to remove, the remaining $SO_2$, $NO_x$, Hg and VOCs are adsorbed and removed integrally by the low-temperature adsorber, and the NO component, which is difficult to adsorb, is removed through adsorption after being oxidized to $NO_2$ by a low-temperature oxidation and adsorption mechanism. The removal of the pollutants is performed by physical methods (such as, dissolution or adsorption), and does not consume $NH_3$, limestone and other materials, so the operating cost is mainly incurred by energy consumption for cooling the flue gas. In addition, the low-temperature adsorbent used in the present disclosure may be regenerated by heating or vacuum sucking to recycle, and $H_2O$, $SO_2$ and $NO_x$ in the flue gas can be recycled for reuse.

Further, the flue gas cooler is operated in a direct spraying and cooling manner or an indirect heat exchange cooling manner. In the direct spraying and cooling manner, a small amount of dust not removed by the electrostatic precipitator is washed down and discharged along with the condensate water.

Further, the low-temperature adsorber includes a first low-temperature adsorber and a second low-temperature adsorber. When the first low-temperature adsorber reaches saturation such that $SO_2$ or NO begins to permeate, the cooled flue gas is switched to the second low-temperature adsorber, and the first low-temperature adsorber is regenerated by heating or vacuum sucking.

BRIEF DESCRIPTION OF THE DRAWINGS

The drawings are used to provide a further understanding of the present disclosure and constitute a part of this specification, and embodiments of the present disclosure and the related descriptions are used to explain the present disclosure, and cannot be improperly construed to limit the present disclosure.

REFERENCE NUMERALS

1: economizer; 2: air preheater; 3: electrostatic precipitator; 4: flue gas cooler; 5: low-temperature adsorber.

DETAILED DESCRIPTION

Detailed description of the present disclosure is given below.

Figure 1:
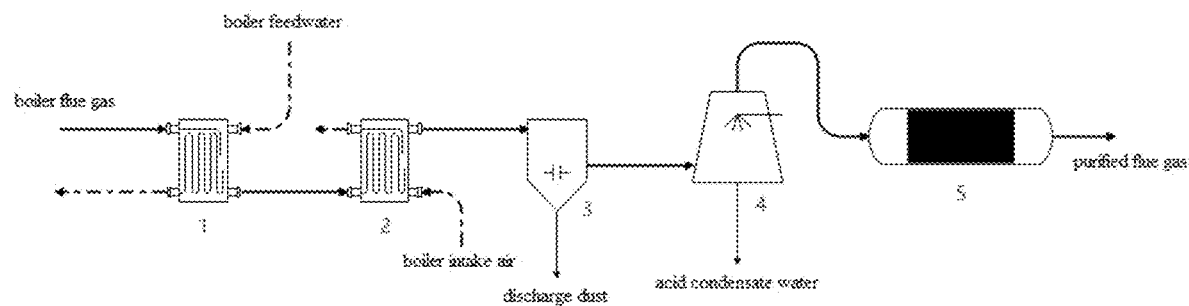
FIG. 1 is a schematic diagram showing a method for integrated removal of multiple pollutants in a flue gas with a near-zero emission according to the present disclosure.

As shown in FIG. 1, a system for integrated removal of multiple pollutants in a flue gas with a near-zero emission provided in the present disclosure includes an economizer 1, an air preheater 2, an electrostatic precipitator 3, a flue gas cooler 4 and a low-temperature adsorber 5.

The economizer 1 has a shell side inlet for feeding boiler flue gas, a tube side inlet for feeding boiler feedwater, and a shell side outlet connected to a tube side inlet of the air preheater 2. The air preheater 2 has a shell side inlet for introducing boiler intake air, and a tube side outlet connected to the electrostatic precipitator 3. A dust discharge port is provided at a bottom of the electrostatic precipitator 3, and a flue gas outlet of the electrostatic precipitator 3 is connected to the flue gas cooler 4. The flue gas cooler 4 is connected with a direct spraying and cooling device or an indirect heat exchange cooling device. A condensate outlet is provided at a bottom of the flue gas cooler 4, and a cold flue gas outlet is provided at a top of the flue gas cooler 4 and connected to the low-temperature adsorber 5. A purified flue gas outlet is provided at a tail of the low-temperature adsorber 5. The low-temperature adsorber 5 is a fixed bed adsorber or a moving bed adsorber. Two low-temperature adsorbers 5 are provided.

The boiler flue gas passes through the economizer 1 to heat the boiler feedwater, and then passes through the air preheater 2 to heat the boiler intake air. The flue gas after heat recovery in the economizer 1 and the air preheater 2 is transferred to the electrostatic precipitator 3 to remove dust in the flue gas. The dedusted flue gas is transferred to the flue gas cooler 4 to be cooled to room temperature or lower. The flue gas cooler 4 is operated in a direct spraying and cooling manner or an indirect heat exchange cooling manner. Moisture in the flue gas is condensed and discharged out of the system.

Figure 2:
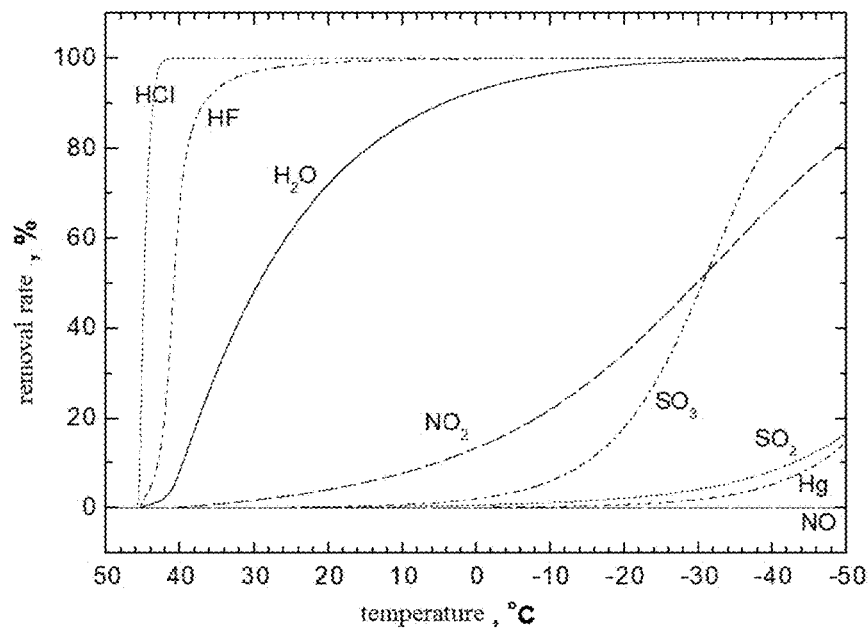
FIG. 2 shows a removal efficiency of flue gas pollutants by dissolved in condensate water at different condensing temperatures.

In the flue gas cooler 4, a part or all of the pollutants in the flue gas are dissolved in the condensate water, and discharged along with the condensate water. As shown in FIG. 2, HCl and HF have strong solubility and are almost completely dissolved in the condensate water. $NO_2$ and $SO_3$ are partially dissolved in the condensate water, $SO_2$ is slightly dissolved in the condensate water, elemental mercury ($Hg^0$) is insoluble in the condensate water, and divalent mercury ($Hg^{2+}$) is partially dissolved in the condensate water. If the spraying and cooling manner is used, a small amount of dust not removed by the precipitator 3 is washed down and discharged along with the condensate water.

The cooled flue gas is transferred to the low-temperature adsorber 5, in which $SO_2$, NO, elemental mercury ($Hg^0$) and the remaining $NO_2$, $SO_3$, divalent mercury ($Hg^{2+}$), VOCs and other pollutants are adsorbed and removed integrally. Among them, $SO_2$, $NO_2$, $SO_3$, Hg and VOCs are directly adsorbed and removed. NO cannot be directly adsorbed and removed, but it can be oxidized by $O_2$ in the flue gas, and then be adsorbed and removed by adsorbents at the low temperature through a low-temperature oxidation and adsorption mechanism. That is, NO and $O_2$ in the flue gas are enriched on a surface of the adsorbent at the low temperature to form a local high concentration, such that NO is quickly oxidized to $NO_2$, and adsorbed on the surface of the adsorbent. The oxidation and adsorption mechanism is the key to realize low-temperature adsorption denitration.

After passing through the flue gas cooler 4 and the low-temperature adsorber 5, $SO_2$, $SO_3$, NO, $NO_2$, HCl, HF, $Hg^0$, $Hg^{2+}$, VOCs, dust and other pollutants in the flue gas are almost completely removed to achieve the near-zero emission.

The adsorbent in the low-temperature adsorber 5 is regenerated by heating or vacuum sucking to be recycled. The low-temperature adsorber 5 may be a fixed bed adsorption tower or a moving bed adsorption tower. The desorbed gas is rich in $SO_2$ and $NO_x$, and may be reused for preparing sulfuric acid, sulfur, nitric acid, sulfate or nitrate.

In order to clearly explain the present disclosure, detailed descriptions are made below in connection with examples and drawings. It would be appreciated by those skilled in the art that the following examples cannot be construed to limit the present disclosure, and any changes and modifications made on the basis of the present disclosure shall fall within the scope of the present disclosure.

Examples: as shown in FIG. 1, the boiler flue gas is cooled to 400° C. after the heat recovery in the economizer 1, and is further cooled to 120° C. after passing through the air preheater 2. The dust in the flue gas is reduced to 20 mg/$Nm^3$ by the electrostatic precipitator 3. The flue gas is transferred to the flue gas cooler 4, and indirectly exchanged heat with a low-temperature refrigerating liquid to be cooled to 5° C. HCl, HF and a part of $SO_2$, $SO_3$, $NO_2$ and divalent mercury $Hg^{2+}$ in the flue gas are dissolved in the condensate water and discharged out of the flue gas cooler 4 together with the condensate water. The low-temperature flue gas is transferred to the fixed-bed adsorber 5, and pollutants such as $SO_2$, NO, $NO_2$, $SO_3$, Hg and VOCs are adsorbed and removed by the filled activated carbon, such that a near-zero emission is achieved.

The low-temperature adsorber 5 includes two adsorbers, i.e., adsorber A and adsorber B, to perform adsorption-regeneration operations alternately. When the adsorber A reaches saturation such that $SO_2$ or NO begins to permeate, the low-temperature flue gas is switched to the adsorber B, and the adsorber A is regenerated by heating or vacuum sucking.

What is claimed is:

1. A system for integrated removal of $SO_2$, $SO_3$, NO, $NO_2$, HCl, HF, Hg, and volatile organic compounds (VOCs) in a flue gas, comprising an economizer (1), an air preheater (2), an electrostatic precipitator (3), a flue gas cooler (4), and a low-temperature adsorber (5) operated at a room temperature or lower;
    wherein the economizer (1) has a shell side inlet for feeding boiler flue gas, a tube side inlet for feeding boiler feedwater, and a shell side outlet connected to a tube side inlet of the air preheater (2);
    the air preheater (2) has a shell side inlet for introducing boiler intake air, and a tube side outlet connected to the electrostatic precipitator (3);
    a dust discharge port is provided at a bottom of the electrostatic precipitator (3), and a flue gas outlet of the electrostatic precipitator (3) is connected to the flue gas cooler (4);
    a condensate outlet is provided at a bottom of the flue gas cooler (4), and a gas outlet of the flue gas cooler (4) is provided at a top of the flue gas cooler (4) and connected to the low-temperature adsorber (5);
    a purified flue gas outlet is provided at a tail of the low-temperature adsorber (5);
    the flue gas cooler (4) is configured to decrease a temperature of the flue gas to a room temperature or lower, and dissolve HCl, HF and a part of $SO_3$, $NO_2$ and Hg in the flue gas into condensate water and discharge the condensate water from the condensate outlet; and
    the low-temperature adsorber (5) is configured to remove NO, $SO_2$, VOCs, and a remaining part of $SO_3$, $NO_2$ and Hg via physical adsorption.

2. The system according to claim 1, wherein the flue gas cooler (4) is configured with a direct spraying and cooling device or an indirect heat exchange cooling device.

3. The system according to claim 1, wherein the low-temperature adsorber (5) is a fixed bed adsorber or a moving bed adsorber.

4. The system according to claim 1, comprising two low-temperature adsorbers (5).

5. A method for integrated removal of $SO_2$, $SO_3$, NO, $NO_2$, HCl, HF, Hg, and volatile organic compounds (VOCs) in a flue gas, using the system according to claim 1, comprising:
    feeding boiler flue gas into the economizer (1) in which boiler feedwater is heated by the boiler flue gas;
    transferring the boiler flue gas to the air preheater (2) in which boiler intake air is heated by the boiler flue gas;
    transferring the flue gas after heat recovery in the economizer (1) and the air preheater (2) to the electrostatic precipitator (3) to remove dust in the flue gas;
    transferring the dedusted flue gas to the flue gas cooler (4) where a temperature of the flue gas is decreased to a room temperature or lower, and HCl, HF and a part of $SO_3$, $NO_2$ and Hg in the flue gas are dissolved in condensate water;
    discharging the condensate water out of the flue gas cooler (4);
    transferring the cooled flue gas to the low-temperature adsorber (5) where NO, $SO_2$, VOCs, and a remaining part of $SO_3$, $NO_2$ and Hg are removed via physical adsorption; and
    discharging a purified flue gas.

6. The method according to claim 5, wherein the flue gas cooler (4) is operated in a direct spraying and cooling manner or an indirect heat exchange cooling manner, wherein in the direct spraying and cooling manner, a remaining amount of dust not removed by the electrostatic precipitator (3) is washed down and discharged along with the condensate water.

7. The method according to claim 5, wherein the low-temperature adsorber (5) includes a first low-temperature adsorber (5) and a second low-temperature adsorber (5), and when the first low-temperature adsorber (5) reaches saturation such that $SO_2$ or NO begins to permeate, the cooled flue gas is switched to the second low-temperature adsorber (5), and the first low-temperature adsorber (5) is regenerated by heating or vacuum sucking.

8. The system according to claim 1, wherein the low-temperature adsorber is configured to remove NO via a low-temperature oxidation and adsorption mechanism.

9. The system according to claim 8, wherein the low-temperature adsorber is configured to enrich NO and $O_2$ in the flue gas on a surface of an adsorbent at the low temperature, such that the NO is oxidized to $NO_2$, and adsorbed on the surface of the adsorbent.

10. The system according to claim 1, wherein the flue gas contains elemental mercury ($Hg^0$) and divalent mercury ($Hg^{2+}$), the flue gas cooler (4) is configured to dissolve a part of the divalent mercury ($Hg^{2+}$) in the flue gas into the condensate water; and
    the low-temperature adsorber (5) is configured to remove the elemental mercury ($Hg^0$), and a remaining part of the divalent mercury ($Hg^{2+}$) via physical adsorption.

11. A system for integrated removal of $SO_2$, $SO_3$, NO, $NO_2$, HCl, HF, Hg, and volatile organic compounds (VOCs) in a coal-burning flue gas, consisting of an economizer (1), an air preheater (2), an electrostatic precipitator (3), a flue gas cooler (4) and a low-temperature adsorber (5) in that order;
- wherein the economizer (1) has a shell side inlet for feeding boiler flue gas, a tube side inlet for feeding boiler feedwater, and a shell side outlet connected to a tube side inlet of the air preheater (2);
- the air preheater (2) has a shell side inlet for introducing boiler intake air, and a tube side outlet connected to the electrostatic precipitator (3);
- a dust discharge port is provided at a bottom of the electrostatic precipitator (3), and a flue gas outlet of the electrostatic precipitator (3) is connected to the flue gas cooler (4);
- a condensate outlet is provided at a bottom of the flue gas cooler (4), and a gas outlet of the flue gas cooler (4) is provided at a top of the flue gas cooler (4) and connected to the low-temperature adsorber (5);
- a purified flue gas outlet is provided at a tail of the low-temperature adsorber (5);
- the flue gas cooler (4) is configured to decrease a temperature of the flue gas to a room temperature or lower, and dissolve HCl, HF and a part of $SO_3$, $NO_2$ and Hg in the flue gas into condensate water and discharge the condensate water from the condensate outlet; and
- the low-temperature adsorber (5) is configured to remove NO, $SO_2$, VOCs, and a remaining part of $SO_3$, $NO_2$ and Hg via physical adsorption.

12. The system according to claim 11, wherein the flue gas cooler (4) is configured with a direct spraying and cooling device or an indirect heat exchange cooling device.

13. The system according to claim 11, wherein the low-temperature adsorber (5) is a fixed bed adsorber or a moving bed adsorber.

14. The system according to claim 11, comprising two low-temperature adsorbers (5).

15. The system according to claim 11, wherein the low-temperature adsorber is configured to remove NO via a low-temperature oxidation and adsorption mechanism.

16. The system according to claim 15, wherein the low-temperature adsorber is configured to enrich NO and $O_2$ in the flue gas on a surface of an adsorbent at the low temperature, such that the NO is quickly oxidized to $NO_2$, and adsorbed on the surface of the adsorbent.

17. The system according to claim 11, wherein the flue gas contains elemental mercury ($Hg^0$) and divalent mercury ($Hg^{2+}$), the flue gas cooler (4) is configured to dissolve a part of the divalent mercury ($Hg^{2+}$) in the flue gas into the condensate water; and
- the low-temperature adsorber (5) is configured to remove the elemental mercury ($Hg^0$), and a remaining part of the divalent mercury ($Hg^{2+}$) via physical adsorption.

18. A method for integrated removal of $SO_2$, $SO_3$, NO, $NO_2$, HCl, HF, Hg, and volatile organic compounds (VOCs) in a flue gas, using the system according to claim 11, comprising:
- feeding boiler flue gas into the economizer (1) in which boiler feedwater is heated by the boiler flue gas;
- transferring the boiler flue gas to the air preheater (2) in which boiler intake air is heated by the boiler flue gas;
- transferring the flue gas after heat recovery in the economizer (1) and the air preheater (2) to the electrostatic precipitator (3) to remove dust in the flue gas;
- transferring the dedusted flue gas to the flue gas cooler (4) where a temperature of the flue gas is decreased to a room temperature or lower, and HCl, HF and a part of $SO_3$, $NO_2$ and Hg in the flue gas are dissolved in condensate water;
- discharging the condensate water out of the flue gas cooler (4);
- transferring the cooled flue gas to the low-temperature adsorber (5) where NO, $SO_2$, VOCs, and a remaining part of $SO_3$, $NO_2$ and Hg are removed via physical adsorption; and
- discharging a purified flue gas.

19. The method according to claim 18, wherein the flue gas cooler (4) is operated in a direct spraying and cooling manner or an indirect heat exchange cooling manner, wherein in the direct spraying and cooling manner, a remaining amount of dust not removed by the electrostatic precipitator (3) is washed down and discharged along with the condensate water.

20. The method according to claim 18, wherein the low-temperature adsorber (5) includes a first low-temperature adsorber (5) and a second low-temperature adsorber (5), and
- when the first low-temperature adsorber (5) reaches saturation such that $SO_2$ or NO begins to permeate, the cooled flue gas is switched to the second low-temperature adsorber (5), and the first low-temperature adsorber (5) is regenerated by heating or vacuum sucking.

* * * * *